(12) United States Patent
Yasuda et al.

(10) Patent No.: US 8,859,070 B2
(45) Date of Patent: Oct. 14, 2014

(54) ELASTIC MEMBRANE

(71) Applicant: Ebara Corporation, Tokyo (JP)

(72) Inventors: Hozumi Yasuda, Tokyo (JP); Katsuhide Watanabe, Tokyo (JP); Keisuke Namiki, Tokyo (JP); Osamu Nabeya, Tokyo (JP); Makoto Fukushima, Tokyo (JP); Satoru Yamaki, Tokyo (JP); Shingo Togashi, Tokyo (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 13/687,263

(22) Filed: Nov. 28, 2012

(65) Prior Publication Data

US 2013/0136884 A1 May 30, 2013

(30) Foreign Application Priority Data

Nov. 30, 2011 (JP) ................. 2011-261327

(51) Int. Cl.
- *B32B 3/00* (2006.01)
- *B32B 3/08* (2006.01)
- *B32B 3/18* (2006.01)
- *B24B 37/30* (2012.01)
- *B32B 27/12* (2006.01)

(52) U.S. Cl.
CPC . *B32B 3/08* (2013.01); *B32B 27/12* (2013.01); *B32B 3/18* (2013.01); *B24B 37/30* (2013.01)
USPC .......................................... 428/64.1; 428/201

(58) Field of Classification Search
CPC .................................. B32B 3/18; B32B 27/12
USPC .................................................. 428/64.1, 201
See application file for complete search history.

(56) References Cited

U.S. PATENT DOCUMENTS

| 6,508,696 | B1 * | 1/2003 | Kobayashi et al. | 451/288 |
| 7,357,699 | B2 * | 4/2008 | Togawa et al. | 451/288 |

FOREIGN PATENT DOCUMENTS

| JP | 2001-54855 | 2/2001 |
| JP | 2004-363505 | 12/2004 |
| JP | 2009-131920 | 6/2009 |
| JP | 4515047 | 5/2010 |

\* cited by examiner

*Primary Examiner* — Elizabeth Mulvaney
(74) *Attorney, Agent, or Firm* — Wenderoth, Lind & Ponack, L.L.P.

(57) ABSTRACT

An elastic member for use in a substrate holding apparatus includes an elastic member and a first reinforcing member. The first reinforcing member has a higher rigidity than the elastic membrane and reinforces substantially an entire area of the contact portion of the elastic membrane. The contact portion of the elastic member has a contact portion for contact with the substrate. The first peripheral wall portion of the elastic membrane is coupled to a peripheral end of the contact portion and extends upwardly. The second peripheral wall portion of the elastic member defines a first chamber on an outer side thereof and a second chamber on an inner side thereof. The first reinforcing member is embedded in substantially the entire area of the contact portion of the elastic membrane.

25 Claims, 14 Drawing Sheets

ELASTIC MEMBRANE

CROSS REFERENCE TO RELATED APPLICATIONS

This document claims priority to Japanese Patent Application No. 2011-261327, filed Nov. 30, 2011, the entire contents of which are hereby incorporated by reference.

BACKGROUND OF THE INVENTION

1. Technical Field

The present invention relates to an elastic membrane for use in a substrate holding apparatus for holding a substrate as a polishing object and pressing the substrate against a polishing surface, especially in a substrate holding apparatus for holding a substrate, such as a semiconductor wafer, in a polishing apparatus for polishing and flattening the substrate.

2. Background Art

As semiconductor devices become more highly and densely integrated, circuit interconnects are becoming increasingly finer and the number of layers of multi-level interconnects is increasing these days. When multi-level interconnects are produced with an increased number of layers and a reduced circuit size, surface irregularities of an underlying layer will be followed and magnified. Therefore, as the number of interconnect layers increases, the coverage (step coverage) of a thin film for a stepped surface shape decreases in the formation of the film. In the production of such multi-level interconnects, therefore, it is necessary to perform surface flattening processing at a proper stage so as to improve the step coverage. On the other hand, as a circuit pattern formed by optical lithography becomes finer, the depth of focus becomes shallower. A surface of a semiconductor device needs to be processed and flattened so that the level difference in surface irregularities becomes smaller than the depth of focus.

Thus, in a semiconductor device manufacturing process, a flattening technique of a surface of a semiconductor device is becoming more and more important. Chemical mechanical polishing (CMP) is the most important flattening technique for use in a semiconductor device manufacturing process. A common CMP process, performed by a polishing apparatus, involves rubbing a substrate, such as a semiconductor wafer, with a polishing surface of a polishing pad while supplying a polishing liquid, containing abrasive particles such as silica (SiO2), to the polishing surface.

A common polishing apparatus includes a polishing table having a polishing surface of a polishing pad, and a substrate holding apparatus for holding a substrate (semiconductor wafer). When polishing a substrate by the polishing apparatus, the substrate, held by the substrate holding apparatus, is pressed against the polishing surface at a predetermined pressure while moving the polishing table and the substrate holding apparatus relative to each other. By thus rubbing the substrate with the polishing surface, the surface of the substrate can be polished into a flat mirror-like surface.

In such a polishing apparatus, if the relative pressure between the substrate and the polishing surface of the polishing pad is not uniform over the entire surface of the substrate during polishing, insufficient polishing or overpolishing may occur locally in the surface of the substrate corresponding to the pressure applied thereto. In a conventional practice, in order to make the pressure on a substrate uniform, pressure chambers defined by an elastic membrane are provided at the bottom of a substrate holding apparatus. A pressurized fluid, such as compressed air, is supplied into each pressure chamber so that a substrate, held by the substrate holder, is pressed by the pressure of the fluid via the elastic membrane.

A flexible material, such as a rubber, is generally used for the elastic membrane in order to use the flexibility to efficiently transmit the fluid pressures of the pressure chambers, formed over the upper surface of the elastic membrane, to a substrate and uniformly press the substrate at a uniform pressure over the entire surface including the edge. To prevent overpolishing at the edge of a substrate, a common phenomenon in polishing of a substrate, the substrate holding apparatus is generally provided with a vertically movable retainer ring located around the periphery of a substrate held by the substrate holding apparatus (see patent document 1).

During polishing of a substrate using the substrate holding apparatus provided with the vertically movable retainer, the elastic membrane is in contact with the substrate in a contact portion of the membrane, having a contact surface. When deformation (elongation) of the contact portion along the contact surface, i.e., in a direction parallel to the contact surface of the contact portion of the elastic membrane, reaches the width of the gap formed between the elastic membrane and the retainer ring, then a frictional force is generated between the retainer ring and the peripheral end of the elastic membrane due to interference between them. The generation of such a frictional force leads to a loss in the pressure of the retainer ring on a polishing surface of a polishing pad in an area around the periphery of the substrate.

To address the problem, a method has been proposed in which a ring, e.g., made of a metal, is attached to the peripheral end of an elastic membrane to reduce deformation of the contact portion of the elastic membrane, having a contact surface for contact with a substrate, thereby preventing contact of the elastic membrane with a retainer ring (see patent document 2).

The method described in patent document 2, however, does not reduce deformation of the contact portion itself along the contact surface (elongation of the contact portion itself in a direction parallel to the contact surface). It is, therefore, conceivable that a difference in the amount of deformation is produced between the center and the periphery of the contact portion of the elastic membrane. Thus, an in-plane variation will be produced in the amount of deformation of the contact portion. The in-plane variation in deformation of the contact portion will cause loosening of the contact portion of the elastic membrane or form a crease in the contact surface of the contact portion, leading to non-uniform contact between a substrate and the contact surface of the contact portion of the elastic membrane.

The applicant has proposed a technique which involves provision of a diaphragm, made of a material having a higher rigidity than an elastic membrane, in the contact portion of the elastic membrane, having a contact surface for contact with a substrate (see patent document 3). The diaphragm is provided in a position straddling two adjacent pressure chambers of all the pressure chambers formed over the elastic membrane. By partially reinforcing the contact portion of the elastic membrane with the diaphragm, a pressure gradient produced between the pressure chambers can be reduced over a wide range.

The technique disclosed in patent document 3, however, is not directed to prevention of interference between the peripheral end of the contact portion of the elastic membrane and a retainer ring by uniformly reducing deformation of the contact portion, having a contact surface for contact with a substrate, along the contact surface in substantially the entire area of the contact portion. The technique is not considered suitable for controlling the pressure on a substrate in the narrow range of the edge portion.

It is possible to suppress contact between an elastic membrane and a retainer ring by appropriately determining the diameter of the elastic membrane and the inner diameter of the retainer ring, taking into consideration of deformation (elongation) of the contact portion of the elastic membrane, having a contact surface for contact with a substrate, along the contact surface, caused by the application of a fluid pressure (s) to pressure chambers formed or defined by the elastic membrane. This method, however, has the disadvantages that (1) the diameter of the elastic membrane and/or the inner diameter of the retainer ring may need to be changed depending on the fluid pressure used, which may necessitate the use of a variety of elastic members and retainer rings, (2) a change of the diameter of the elastic membrane and/or the inner diameter of the retainer ring will affect the polishing performance, etc.

PRIOR ART DOCUMENTS

Patent document 1: Japanese Patent No. 4515047
Patent document 2: Japanese Patent Laid-Open Publication No. 2001-54855
Patent document 3: Japanese Patent Laid-Open Publication No. 2009-131920

SUMMARY OF THE INVENTION

The present invention has been made in view of the above situation. It is therefore an object of the present invention to provide an elastic membrane which can uniformly reduce deformation (elongation) of its contact portion, having a contact surface for contact with a substrate, along the contact surface in substantially the entire area of the contact portion from the center to the periphery, thereby preventing contact of the elastic membrane with a retainer ring disposed around the periphery of the elastic membrane, and can prevent loosening of the contact portion or the formation of a crease in the contact surface of the contact portion, thereby ensuring uniform contact between a substrate and the contact surface of the contact portion.

In order to achieve the object, the present invention provides an elastic membrane for use in a substrate holding apparatus for holding a substrate, with a retainer ring located around a periphery of the substrate. The elastic membrane comprises a contact portion having a contact surface for contact with the substrate; a first peripheral wall portion coupled to a peripheral end of the contact portion and extending upwardly; and a second peripheral wall portion located on the inside of the first peripheral wall portion, coupled to the contact portion and extending upwardly, and defining a first chamber on the outer side thereof and a second chamber on the inner side thereof. In the elastic membrane, substantially the entire area of the contact portion is reinforced with a reinforcing member having a higher rigidity than the elastic membrane.

According to the elastic membrane of the present invention, substantially the entire area of the contact portion, having a contact surface for contact with a substrate, is reinforced with a reinforcing member having a higher rigidity than the elastic membrane. This can uniformly reduce deformation (elongation) of the contact portion along the contact surface in substantially the entire area of the contact portion from the center to the periphery, thereby preventing contact of the elastic membrane with a retainer ring disposed around the periphery of the elastic membrane. This can also prevent loosening of the contact portion or the formation of a crease in the contact surface of the contact portion, thereby ensuring uniform contact between a substrate and the contact surface of the contact portion.

When the substrate has a circular shape and the contact portion also has a circular shape, the reinforcing member is preferably comprised of a thread-like member(s) arranged in a radial, concentric or spiral pattern in substantially the entire area of the contact portion.

The use of such a thread-like reinforcing member(s) can reduce deformation (elongation) of the contact portion of the elastic membrane along the contact surface while best permitting deformation of the contact portion in a direction perpendicular to the contact surface. When thread-like members are arranged in a radial pattern, the angle (pitch angle) between adjacent thread-like members is preferably not more than 5°. When a thread-like member(s) is arranged in a concentric or spiral pattern, the spacing between adjacent thread-like members or turns in the radial direction is preferably not more than 20 mm.

The reinforcing member may be comprised of thread-like members arranged in a grid-like pattern in substantially the entire area of the contact portion. The pitch of the grid-like members is preferably not more than 20 mm in both the orthogonal directions.

The reinforcing member may be comprised of a non-woven or woven fabric or a resin plate disposed in substantially the entire area of the contact portion.

When the contact portion of the elastic membrane is reinforced with a non-woven or woven fabric, the non-woven or woven fabric preferably has isotropic properties. When the contact portion of the elastic membrane is reinforced with a sheet-like resin plate, the resin plate preferably has a thickness of not more than 1 mm. The use of such a reinforcing member can best permit deformation of the contact portion in a direction perpendicular to the contact surface while reducing deformation (elongation) of the contact portion along the contact surface.

When the contact portion of the elastic membrane has suction holes, the reinforcing member is preferably disposed in a region other than the suction holes and their vicinities. This can prevent part or all of the suction holes from being closed by the reinforcing member.

At least one of the first peripheral wall portion and the second peripheral wall portion may be reinforce with a second reinforcing member having a higher rigidity than the elastic membrane.

The second reinforcing member is preferably provided in the first and/or second peripheral wall portion in a region other than the junction with the contact portion. This can reinforce the first and/or second peripheral wall portion with the second reinforcing member while ensuring the stretchability of the junction between the first and/or second peripheral wall portion and the contact portion.

Preferably, the second reinforcing member is comprised of annular thread-like members arranged at predetermined intervals in the height direction, a coiled thread-like member, a resin plate, a non-woven fabric or a woven fabric.

Preferably, a low-friction member is attached to an outer surface of the first peripheral wall portion.

By thus attaching a low-friction member to the outer surface of the first peripheral wall portion disposed at the peripheral end of the contact portion, it becomes possible to reduce a loss in the pressure of the retainer ring on a polishing surface of a polishing pad in an area around the periphery of a substrate if, due to elongation of the contact portion of the elastic membrane, the first peripheral wall portion comes into contact with the retainer ring.

The low-friction member preferably is a coating film which may be an impregnated film or a fluoropolymer film.

According to the present invention, deformation (elongation) of the contact portion of the elastic membrane, having a contact surface for contact with a substrate, along the contact surface, caused by the application of a fluid pressure to the pressure chambers formed or defined by the elastic membrane, can be uniformly reduced over the entire area of the contact portion from the center to the periphery. This can prevent contact of the elastic membrane with a retainer ring, thereby preventing a loss or variation in the pressure of the retainer ring on a polishing surface of a polishing pad in an area around a periphery of a substrate. This can also prevent loosening of the contact portion or the formation of a crease in the contact surface of the contact portion, thereby ensuring uniform contact between a substrate and the contact surface of the contact portion. Thus, the use of the elastic membrane of the present invention makes it possible to press a substrate against a polishing pad uniformly at a desired pressure.

Further, the use of a low-friction member on the outer surface of the first peripheral wall portion can reduce a loss in the pressure of the retainer ring on a polishing surface of a polishing pad in an area around a periphery of a substrate if, due to elongation of the contact portion of the elastic membrane, the first peripheral wall portion comes into contact with the retainer ring.

DETAILED DESCRIPTION OF THE PREFERRED EMBODIMENTS

Figure 1:
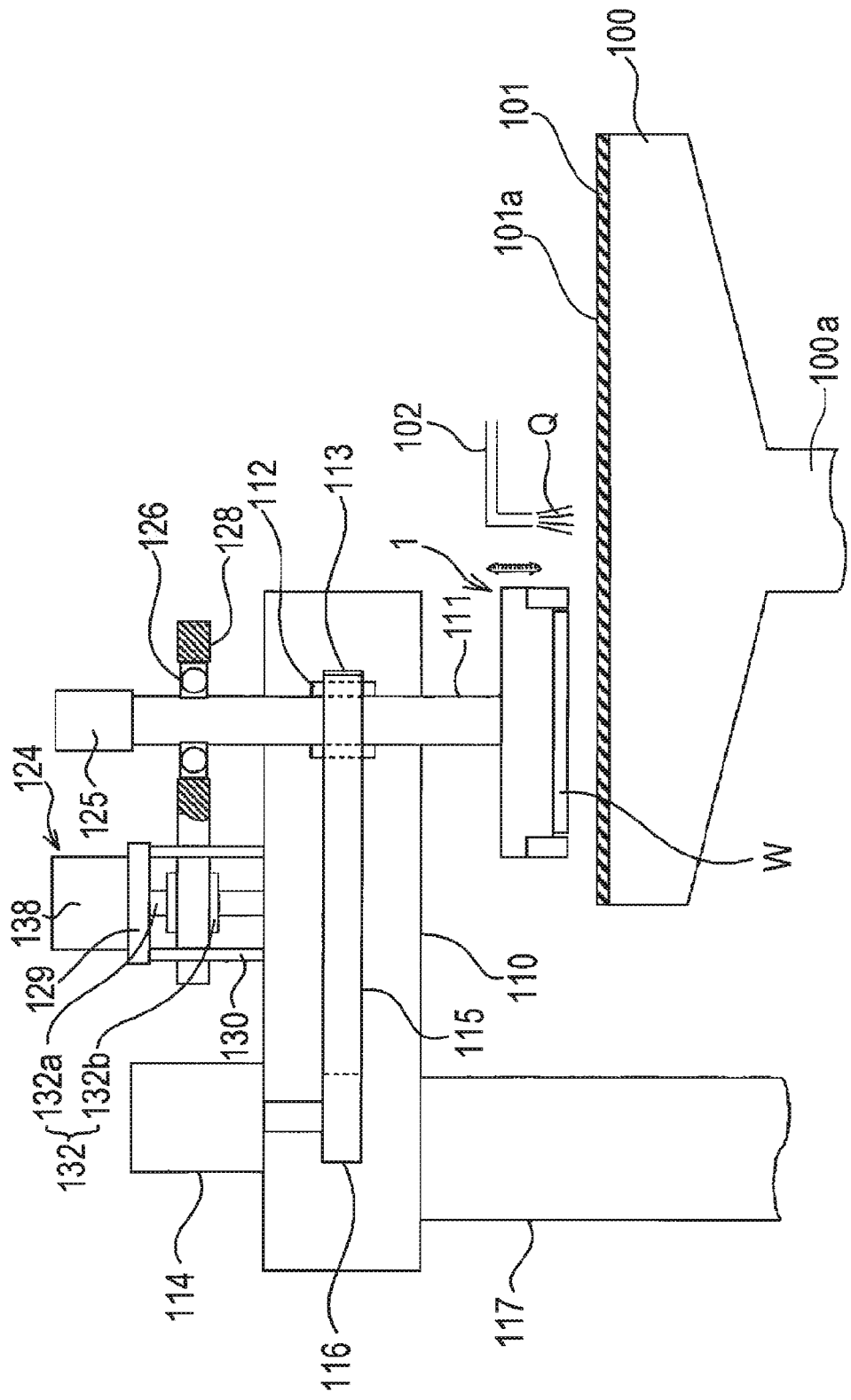
FIG. 1 is a schematic view showing the overall construction of a polishing apparatus including a substrate holding apparatus provided with an elastic membrane according to the present invention.

Preferred embodiments of the present invention will now be described in detail with reference to the drawings. The same reference numerals will be used throughout the drawings and the description to refer to the same or like members, components, etc., and a duplicate description thereof will be omitted.

FIG. 1 is a schematic view showing the overall construction of a polishing apparatus including a substrate holding apparatus provided with an elastic membrane according to the present invention. As shown in FIG. 1, the polishing apparatus includes a polishing table 100 and a substrate holding apparatus (top ring) 1 for holding a substrate W, such as a semiconductor wafer, as a polishing object and pressing the substrate W against a polishing surface 101a on the polishing table 100.

The polishing table 100 is coupled via a table shaft 100a to a motor (not shown), disposed below the polishing table 100, so that the polishing table 100 is rotatable on the table shaft 100a. A polishing pad 101 is attached to the upper surface of the polishing table 100, with the surface of the polishing pad 101 constituting the polishing surface 101a for polishing a surface W. Above the polishing table 100 is disposed a polishing liquid supply nozzle 102 which supplies a polishing liquid Q to the polishing pad 101 on the polishing table 100.

The substrate holding apparatus 1 is coupled to a main shaft 111 which is vertically movable with respect to a polishing head 110 by a vertical movement mechanism 124. The substrate holding apparatus 1 is moved vertically and positioned with respect to the polishing head 110 by the vertical movement of the main shaft 111. A rotary joint 125 is mounted to the upper end of the main shaft 111.

The vertical movement mechanism 124 for vertically moving the main shaft 111 and the substrate holding apparatus 1 includes a bridge 128 which rotatably supports the main shaft 111 via a bearing 126, a ball screw 132 mounted to the bridge 128, a support table 129 supported by support posts 130, and an AC servomotor 138 provided on the support table 129. The support table 129 supporting the servomotor 138 is secured to the polishing head 110 via the support posts 130.

The ball screw 132 includes a threaded shaft 132a coupled to the servomotor 138 and a nut 132b that engages the threaded shaft 132a. The main shaft 111 is configured to move vertically together with the bridge 128. When the servomotor 138 is driven, the bridge 128 moves vertically by the ball screw 132 and, therefore, the main shaft 111 and the substrate holding apparatus 1 move vertically.

The main shaft 111 is coupled via a key (not shown) to a rotating cylinder 112. The rotating cylinder 112, on its peripheral surface, is provided with a timing pulley 113. A lifting motor 114 is secured to the polishing head 110. The timing pulley 113 is connected via a timing belt 115 to a timing pulley 116 provided in the lifting motor 114. When the lifting motor 114 is rotationally driven, the rotating cylinder 112 and the main shaft 111 rotate together by the timing pulley 116, the timing belt 115 and the timing pulley 113, whereby the substrate holding apparatus 1 rotates. The polishing head 110 is supported by a pivot shaft 117 rotatably supported by a frame (not shown).

In the polishing apparatus having the construction shown in FIG. 1, the substrate holding apparatus 1 is configured to be capable of holding a substrate W, such as a semiconductor wafer, on the lower surface. The polishing head 110 is configured to be pivotable on the pivot shaft 117. By pivoting the polishing head 110, the substrate holding apparatus 1, holding a substrate W on the lower surface, is moved from a substrate receiving position to a position above the polishing table 100. While rotating the substrate holding apparatus 1 and the polishing table 100, the substrate holding apparatus 1 is lowered to press the substrate W against the polishing surface 101a of the polishing pad 101. While thus rubbing the surface of the substrate W with the polishing surface 101a of the polishing pad 101, a polishing liquid is supplied onto the polishing pad 101 from the polishing liquid supply nozzle 102 provided above the polishing table 100 to carry out polishing of the surface of the substrate W.

Figure 2:
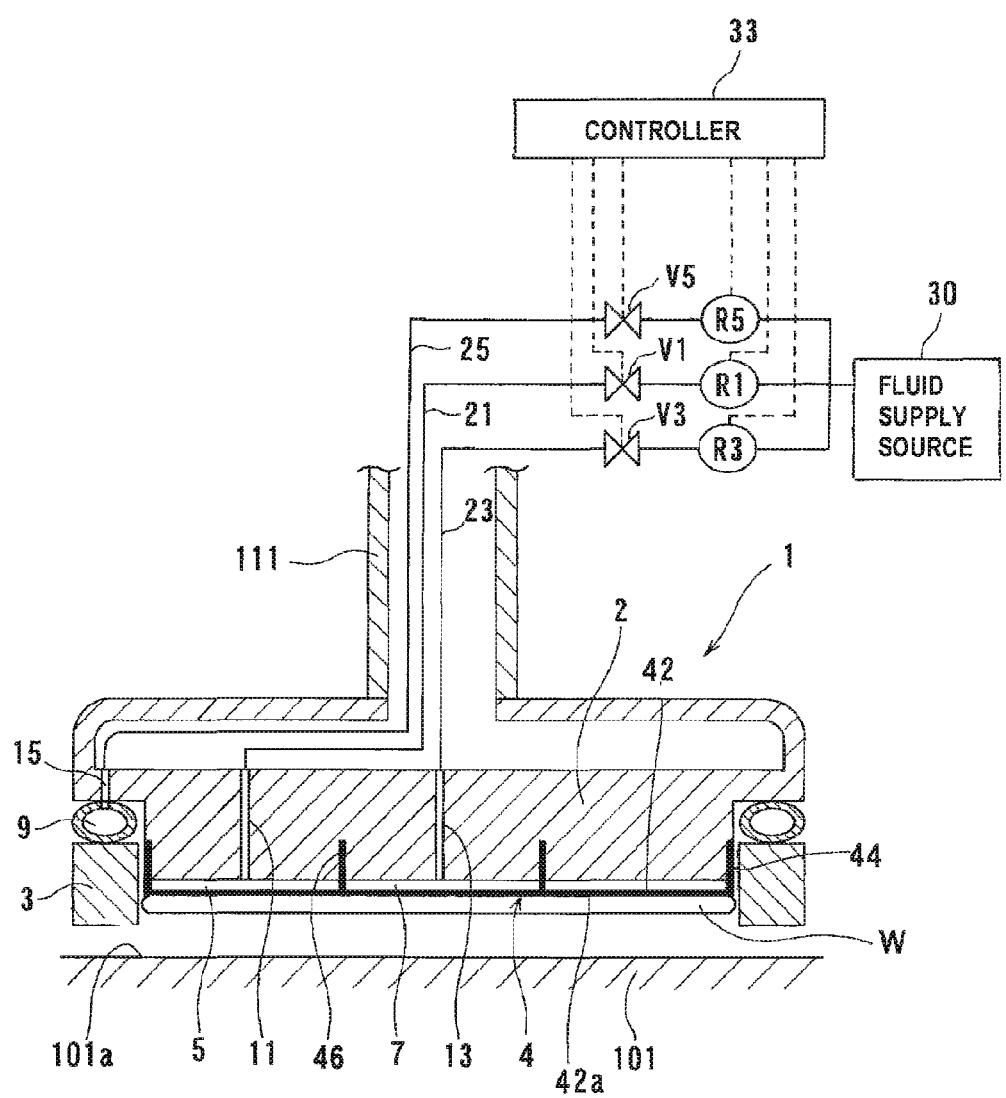
FIG. 2 is a schematic cross-sectional view of the substrate holding apparatus shown in FIG. 1.

Next, the substrate holding apparatus 1 will be described. FIG. 2 is a schematic cross-sectional view of the substrate holding apparatus 1 for holding a substrate W as a polishing object and pressing the substrate W against the polishing surface 101a of the polishing pad 101. Only the main components of the substrate holding apparatus 1 are illustrated in FIG. 2.

As shown in FIG. 2, the substrate holding apparatus 1 consists basically of an apparatus body 2 for pressing a substrate W against the polishing surface 101a, and a retainer ring 3 for directly pressing on the polishing surface 101a. The apparatus body 2 is comprised of a generally disk-shaped member, and the retainer ring 3 is disposed at the periphery of the apparatus body 2. The apparatus body 2 is formed of a resin, such as an engineering plastic (e.g., PEEK). An elastic membrane 4 for contact with the back surface of the substrate W is attached to the lower surface of the apparatus body 2. The elastic membrane 4 is formed of a rubber material having excellent strength and durability, such as ethylene propylene rubber (EPDM), polyurethane rubber or silicon rubber.

The elastic membrane 4 consists of a flat plate-like contact portion 42 having a contact surface 42a for contact with substantially the entire area of the back surface (upper surface) of the substrate W, a first peripheral wall portion 44 coupled to the peripheral end of the contact portion 42 and extending upwardly, and a second peripheral wall portion 46 located on the inside of the first peripheral wall portion 44, coupled to the contact portion 42 and extending upwardly. The top of the first peripheral wall portion 44 and the top of the second peripheral wall portion 46 are coupled to the apparatus body 2, so that the elastic membrane 4 is secured to the apparatus body 2. Thus, an annular first pressure chamber 5, defined between the first peripheral wall portion 44 and the second peripheral wall portion 46, and a cylindrical second pressure chamber 7, peripherally surrounded by the second peripheral wall portion 46, are formed between the apparatus body 2 and the elastic membrane 4. In this embodiment, the first peripheral wall portion 44 and the second peripheral wall portion 46 are coupled to the contact portion 42 such that the wall portions extend vertically from the contact portion 42.

A fluid passage 11, communicating with the first pressure chamber 5, and a fluid passage 13, communicating with the second pressure chamber 7, are formed in the apparatus body 2. The fluid passage 11 is connected to a fluid supply source 30 via a fluid conduit 21, e.g., a tube or a connector, and the fluid passage 13 is connected to the fluid supply source 30 via a fluid conduit 23, e.g., a tube or a connector. The fluid conduit 21 is provided with an on-off valve V1 and a pressure regulator R1, and the fluid conduit 23 is provided with an on-off valve V3 and a pressure regulator R3. The fluid supply source 30 supplies a pressurized fluid such as compressed air.

The substrate holding apparatus 1 also has a retainer chamber 9 provided just above the retainer ring 3. The retainer chamber 9 is connected to the fluid supply source 30 via a fluid passage 15, formed in the apparatus body 2, and a fluid conduit 25, e.g., a tube or a connector. The fluid conduit 25 is provided with an on-off valve V5 and a pressure regulator R5. The pressure regulators R1, R3 and R5 each have a pressure regulating function to regulate the pressure of a pressurized fluid to be supplied from the fluid supply source 30 to the first pressure chamber 5, the second pressure chamber 7 or the retainer chamber 9. The pressure regulators R1, R3 and R5, and the on-off valves V1, V3 and V5 are connected to a controller 33 for controlling the operations of the devices.

Thus, in the polishing apparatus 1 having the construction shown in FIG. 2, the first pressure chamber 5 and the second pressure chamber 7 are formed between the elastic membrane 4 and the apparatus body 2, and the retainer chamber 9 is formed just above the retainer ring 3; and the pressures of the fluids supplied to the first pressure chamber 5, the second pressure chamber 7 and the retainer chamber 9 can be independently regulated by the pressure regulators R1, R3 and R5, respectively. Therefore, the pressure of a substrate W on the polishing pad 101 can be regulated for each of those areas of the substrate W which correspond to the first and second pressure chambers 5 and 7. Further, the pressure of the retainer ring 3 on the polishing pad 101 can also be regulated.

In particular, the pressure of a substrate on the polishing pad 101 can be regulated independently for the annular area of the substrate, lying just under the first pressure chamber 5, and for the circular area of the substrate, lying just under the second pressure chamber 7. The pressure of the retainer ring 3 on the polishing pad 101 can also be regulated independently.

When the first pressure chamber 5 and the second pressure chamber 7, formed between the elastic membrane 4 and the apparatus body 2, are pressurized by introducing pressurized fluids into the chambers 5, 7, deformation (elongation) of the contact portion 42 of the elastic membrane 4 will occur along the contact surface 42a for contact with a substrate W, i.e., in a direction parallel to the contact surface 42a. Such deformation of the contact portion 42 can bring the first peripheral wall portion 44, coupled to the peripheral end of the contact portion 42, into contact with the inner peripheral surface of the retainer ring 3. To prevent contact of the first peripheral wall portion 44 with the inner peripheral surface of the retainer ring 3, it is desirable to use as the elastic membrane 4 a membrane which exhibits a radial deformation (elongation) of not more than 1 mm in the contact portion 42 when, for example, a substrate W having a diameter of 300 mm is to be polished, and the first pressure chamber 5 and the second pressure chamber 7 are to be pressurized to 50 kPa. However, such an elastic membrane 4 will exhibit an insufficient deformation (elongation) in a direction perpendicular to the contact surface 42a of the elastic membrane 4.

Figure 3:
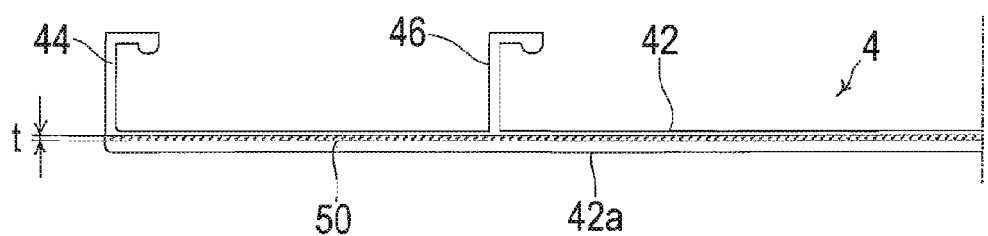
FIG. 3 is a cross-sectional view of a portion of an elastic membrane according to an embodiment of the present invention, provided in the substrate holding apparatus shown in FIG. 2.
Figure 4:
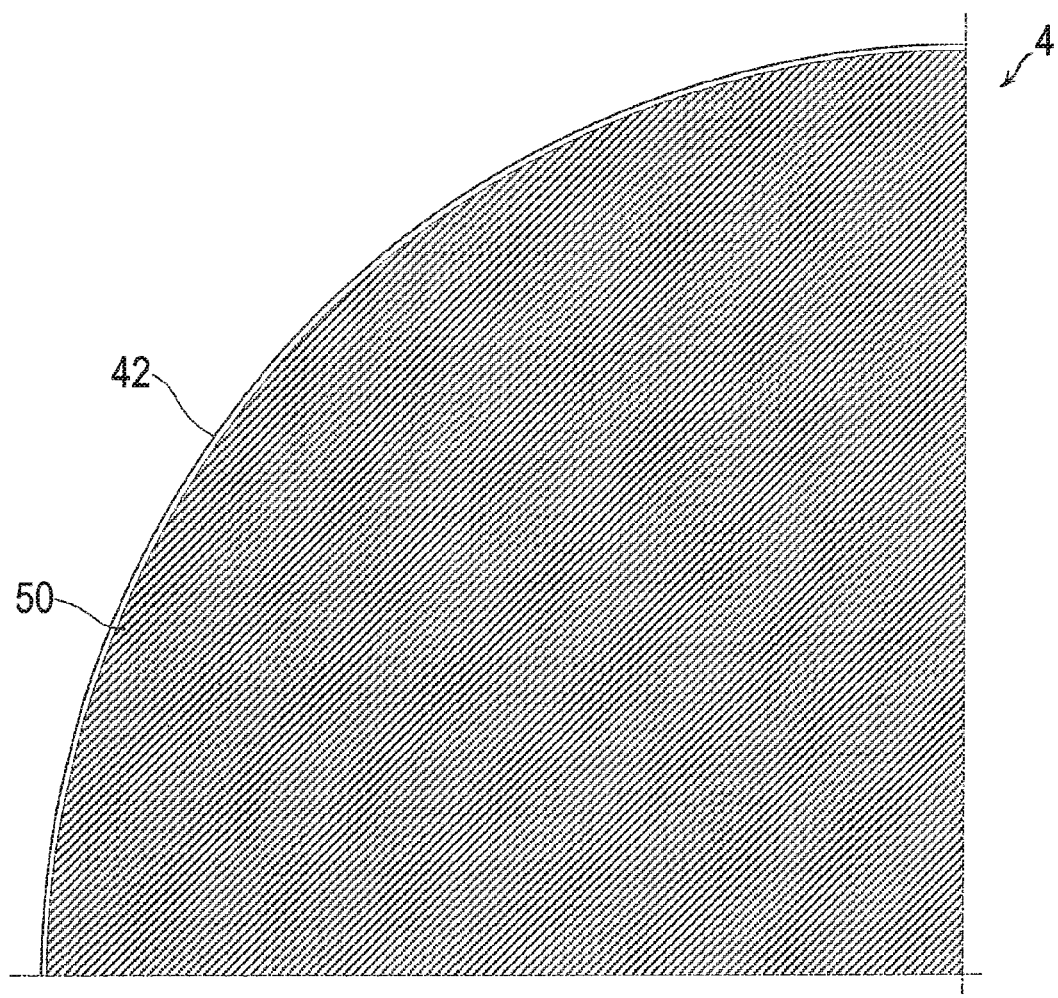
FIG. 4 is a diagram illustrating the reinforcing member embedded in the contact portion of the elastic membrane shown in FIG. 3.

As shown in FIGS. 3 and 4, in this embodiment, therefore, a sheet-like resin plate 50 as a reinforcing member, having a higher rigidity (longitudinal elastic modulus) than the elastic membrane 4, is embedded in substantially the entire area of the contact portion 42 in order to reinforce substantially the entire area of the contact portion 42 with the resin plate (reinforcing member) 50. This makes it possible to reinforce substantially the entire area of the contact portion 42 with the resin plate (reinforcing member) 50 while using, for the elastic membrane 4, a material having such an rigidity (elasticity) as to permit a sufficient deformation (elongation) of the contact portion 42 in a direction perpendicular to the contact surface 42a. The reinforcing member 50 and elastic membrane 4 together constitute an elastic member. It therefore becomes possible to uniformly reduce deformation (elongation) of the contact portion 42 along the contact surface 42a in substantially the entire area of the contact portion 42 from the center to the periphery, thereby preventing contact of the elastic membrane 4 with the retainer ring 3 disposed around the periphery of the elastic membrane 4. It also becomes possible to prevent loosening of the contact portion 42 or the formation of a crease in the contact surface 42a of the contact portion 42, thereby ensuring uniform contact between a substrate W and the contact surface 42a of the contact portion 42.

In this embodiment, the resin plate 50 has a thickness "t" of not more than 1 mm so that the resin plate 50, embedded in the contact portion 42, will not hinder deformation of the contact portion 42 in a direction perpendicular to the contact surface 42a.

A reinforcing member, such as the resin plate 50, needs to be disposed in the contact portion 42 in such a manner that it will not be exposed on the contact surface 42a for contact with a substrate W nor on the peripheral surface (opposite from the surface to which a fluid pressure is applied) which faces the retainer ring 3. If fibers or the like, for example, of a reinforcing member are exposed on the contact surface 42a or the peripheral surface of the contact portion 42, there is a fear of the production of dust from the exposed fibers or the like. Further, a slurry will adhere to a reinforcing member, such as fibers, exposed on the surface of the elastic membrane 4. The residual slurry on the elastic membrane 4 can cause scratches in a substrate W.

The first peripheral wall portion 44 and the second peripheral wall portion 46 of this embodiment, which are coupled to the contact portion 42 and extend upwardly, are required to have sufficient stretchability in a direction perpendicular to the contact surface 42a of the contact portion 42. If the stretchability of the first peripheral wall portion 44 and the second peripheral wall portion 46 is insufficient in a direction perpendicular to the contact surface 42a of the contact portion 42, the pressure on a substrate W will be locally low in those areas of the substrate W which lie under the first peripheral wall portion 44 and the second peripheral wall portion 46. Thus, in-plane variation will be produced in the pressure of the contact portion 42 on the substrate W, leading to non-uniform in-plane distribution of the polishing rate.

In this embodiment, therefore, only the contact portion 42 of the elastic membrane 4 is reinforced, i.e. the first peripheral wall portion 44 and the second peripheral wall portion 46 are not reinforced, to reduce deformation (elongation) of the contact portion 42 along the contact surface 42a while preventing the in-plane variation of the pressure on a substrate.

Though not shown diagrammatically, the elastic membrane 4 has suction holes for vacuum attraction of a substrate W. The suction holes each communicate with the first pressure chamber 5 or the second pressure chamber 7. By vacuuming the first pressure chamber 5 and the second pressure chamber 7, a substrate W can be attracted to and held on the contact surface 42a of the elastic membrane 4. In this embodiment, the resin plate (reinforcing member) 50 is disposed in a region other than the suction holes and their vicinities. This prevents part or all of the suction holes from being closed by the resin plate (reinforcing member) 50. The same holds true for the below-described embodiments.

Next, polishing of a substrate W, performed by using the substrate holding apparatus 1 having the construction shown in FIG. 2, will be described.

The substrate holding apparatus 1 receives a substrate W from a substrate transfer apparatus and holds the substrate W by vacuum attraction. The substrate holding apparatus 1, holding the substrate W by vacuum attraction, is lowered to a preset polishing position of the substrate holding apparatus 1. Before polishing is started and when the substrate holding apparatus 1 is in the polishing position, the retainer ring 3 is in contact with the polishing surface 101a of the polishing pad 101, whereas there is a small gap (e.g., about 1 mm) formed between the lower surface (surface to be polished) of the substrate W and the polishing surface 101a of the polishing pad 101 because the substrate W before polishing is attracted and held by the substrate holding apparatus 1. The polishing table 100 and the substrate holding apparatus 1 both have been rotationally driven.

Then, the on-off valves V1 and V3 are opened simultaneously to supply a pressurized fluid from the fluid supply source 30 to the first pressure chamber 5 and the second pressure chamber 7, thereby expanding the elastic membrane 4 on the back surface (upper surface) of the substrate W. The contact surface 42a of the contact portion 42 of the elastic membrane 4, in contact with the upper surface of the substrate W, then presses on the substrate W downward and brings the lower surface (surface to be polished) of the substrate W into contact with the polishing surface 101a of the polishing pad 101. Polishing of the surface of the substrate W is then carried out while supplying a polishing liquid Q from the polishing liquid supply nozzle 102 onto the polishing surface 101a of the polishing pad 101.

When the elastic membrane 4 on the back side of the substrate W is thus expanded by supplying a pressurized fluid to the first pressure chamber 5 and the second pressure chamber 7, the elastic membrane 4, especially the contact portion 42, deforms along the contact surface 42a.

According to this embodiment, substantially the entire area of the contact portion 42, having the contact surface 42a for contact with a substrate W, is reinforced with the resin plate (reinforcing member) 50 having a higher rigidity (longitudinal elastic modulus) than the elastic membrane 4. This can uniformly reduce deformation (elongation) of the contact portion 42 along the contact surface 42a in substantially the entire area of the contact portion 42 from the center to the periphery while best permitting deformation of the contact portion 42 in a direction perpendicular to the contact surface 42a, thereby preventing contact of the elastic membrane 4 with the retainer ring 3 disposed around the periphery of the elastic membrane 4. This can also prevent loosening of the contact portion 42 or the formation of a crease in the contact surface 42a of the contact portion 42, thereby ensuring uniform contact between the substrate W and the contact surface 42a of the contact portion 42.

Though in the this embodiment substantially the entire area of the contact portion 42 of the elastic membrane 4 is reinforced with the resin plate (reinforcing member) 50 having a higher rigidity (longitudinal elastic modulus) than the elastic membrane 4, it is possible to use, instead of the resin plate 50, a woven fabric or a non-woven fabric, having a higher rigidity (longitudinal elastic modulus) than the elastic membrane 4, as a reinforcing material to reinforce substantially the entire area of the contact portion 42 of the elastic membrane 4 with the woven or non-woven fabric. A fabric, such as a woven fabric or a non-woven fabric, generally has directionality in the stretchability. The effect of reducing stretch (elongation) of the elastic membrane 4, produced by a woven or non-woven fabric, is high in a direction parallel to fibers but low in other directions. Therefore, when reinforcing substantially the entire area of the contact portion 42 of the elastic membrane 4 with a woven or non-woven fabric, it is desirable to use a woven or non-woven fabric having isotropic properties. Such an isotropic woven or non-woven fabric can be obtained by combining at least two types of woven or non-woven fabrics.

Figure 5:
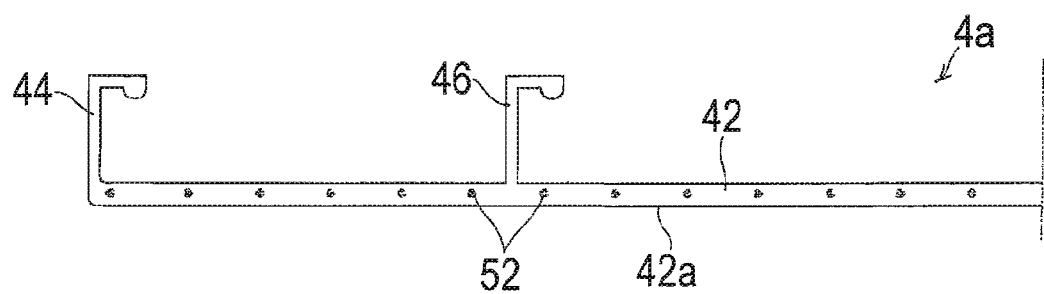
FIG. 5 is a cross-sectional view of a portion of an elastic membrane according to another embodiment of the present invention.
Figure 6:
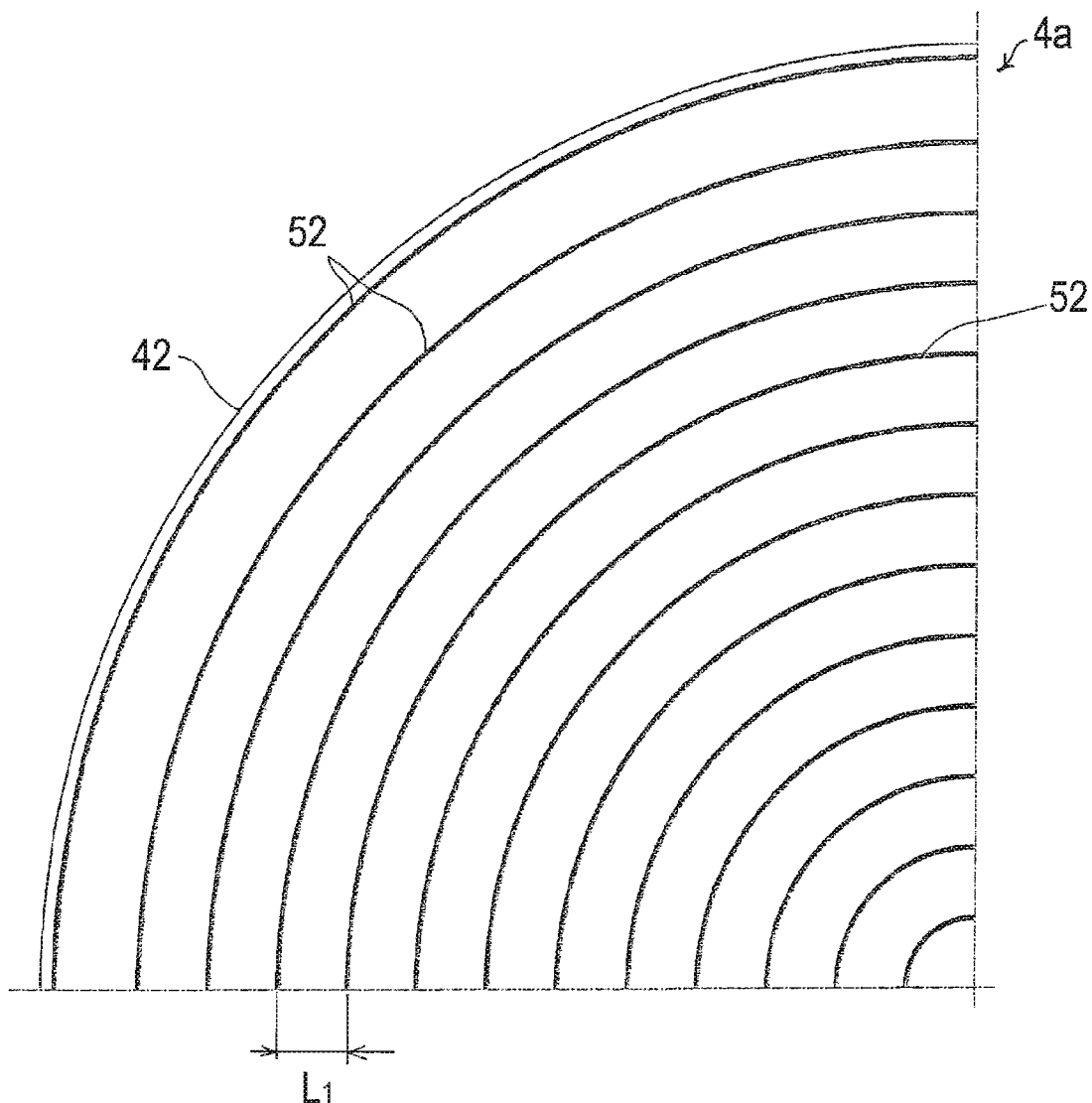
FIG. 6 is a diagram illustrating the reinforcing member embedded in a concentric pattern in the contact portion of the elastic membrane shown in FIG. 5.

FIGS. 5 and 6 show an elastic membrane 4a according to another embodiment of the present invention. The elastic membrane 4a of this embodiment differs from the elastic membrane 4 shown in FIGS. 2 through 4 in that annular thread-like members 52, having a higher rigidity (longitudinal elastic modulus) than the elastic membrane 4a, are used as a reinforcing member. The thread-like members 52 are embedded, in a pattern of concentric circles arranged around the center of the contact portion 42 of the elastic membrane 4a, in substantially the entire area of the contact portion 42 to reinforce substantially the entire area of the contact portion 42 with the annular thread-like members (reinforcing member) 50.

A material having excellent strength is preferably used for the thread-like members 52. Examples may include a metal material, such as stainless steel wires, and a resin material, such as aramid, nylon or polyester fibers. The same holds true for the below-described embodiments.

In the annular thread-like members (reinforcing member) 52 of this embodiment, embedded in a concentric pattern in substantially the entire area of the contact portion 42, the spacing $L_1$ between adjacent thread-like members 52 in the radial direction is preferably not more than 20 mm.

Figure 7:
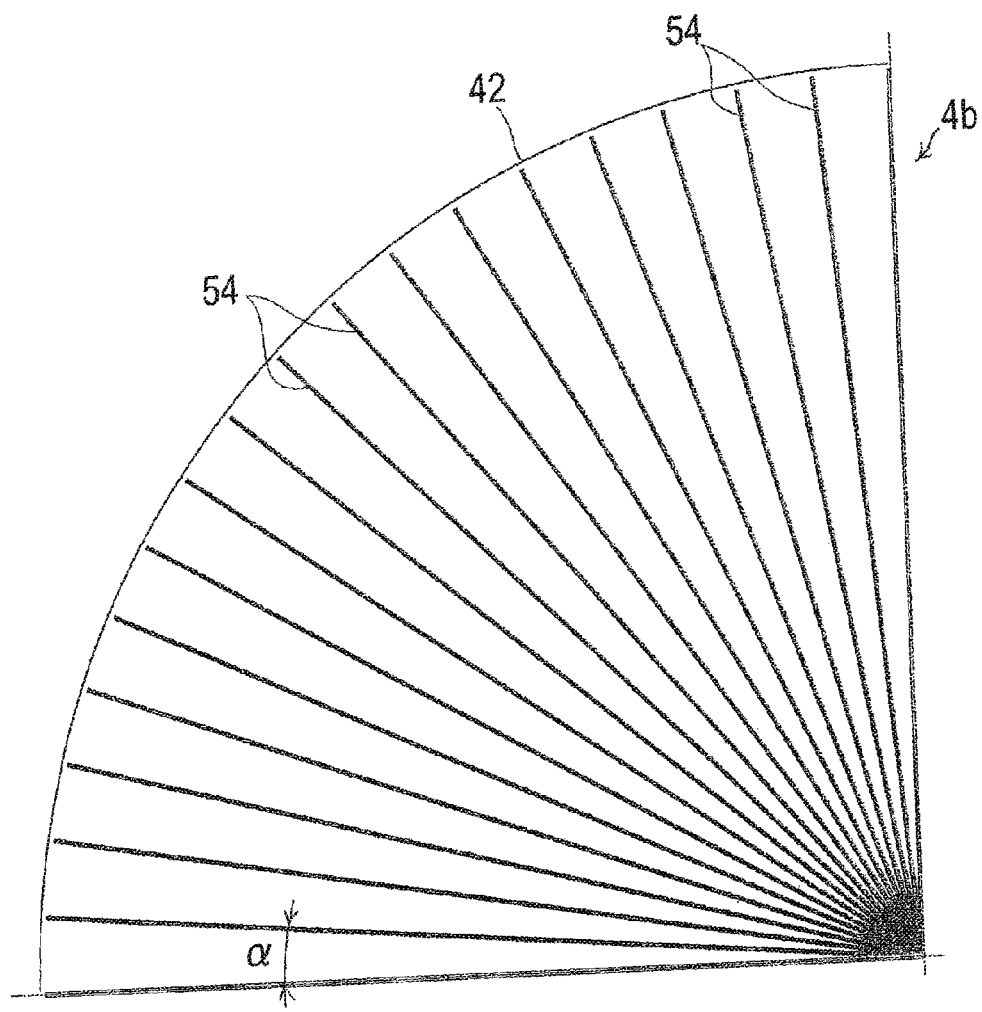
FIG. 7 is a diagram illustrating a reinforcing member embedded in a radial pattern in the contact portion of an elastic membrane according to yet another embodiment of the present invention.

FIG. 7 shows an elastic membrane 4b according to yet another embodiment of the present invention. The elastic membrane 4b of this embodiment differs from the elastic membrane 4a shown in FIGS. 5 and 6 in that thread-like members 54, having a higher rigidity (longitudinal elastic modulus) than the elastic membrane 4b and arranged in a radial pattern, are used as a reinforcing member. Thus, the thread-like members 54, extending radially from the center of the contact portion 42 of the elastic membrane 4b, are embedded in substantially the entire area of the contact portion 42 to reinforce substantially the entire area of the contact portion 42 with the thread-like members (reinforcing member) 54.

In the thread-like members (reinforcing member) 54 of this embodiment, embedded in a radial pattern in substantially the entire area of the contact portion 42, the angle (pitch angle) $\alpha$ between adjacent thread-like members 54 is preferably not more than 5°.

Figure 8:
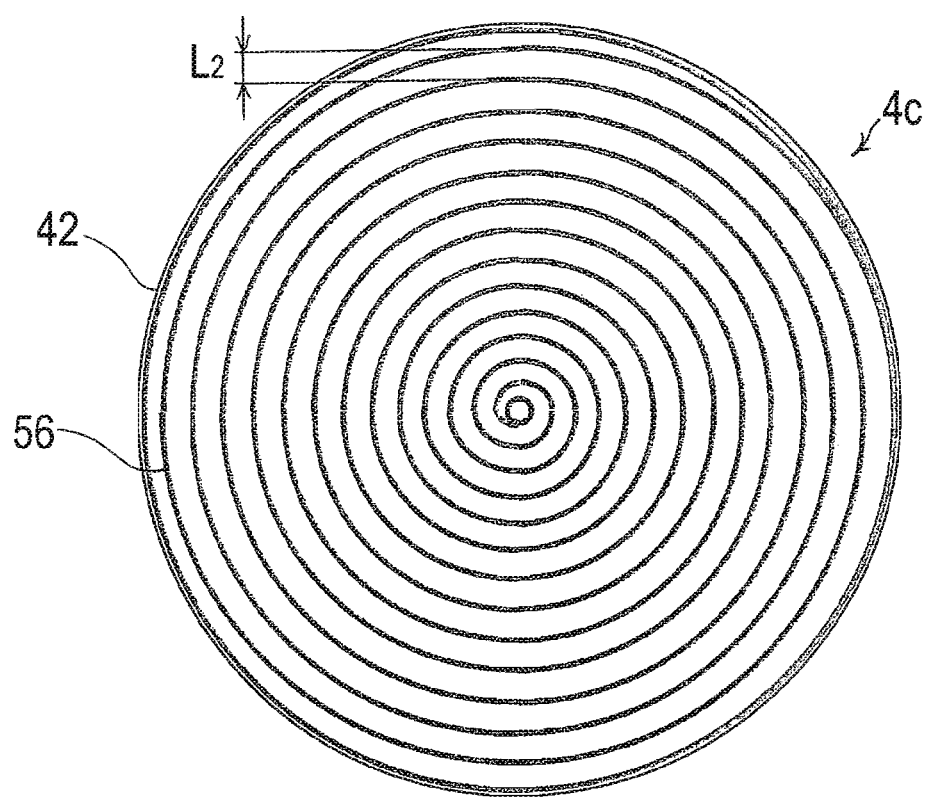
FIG. 8 is a diagram illustrating a reinforcing member embedded in a spiral pattern in the contact portion of an elastic membrane according to yet another embodiment of the present invention.

FIG. 8 shows an elastic membrane 4c according to yet another embodiment of the present invention. The elastic membrane 4c of this embodiment differs from the elastic membrane 4a shown in FIGS. 5 and 6 in that a thread-like member 56, having a higher rigidity (longitudinal elastic modulus) than the elastic membrane 4c and arranged in a spiral pattern (in a coiled shape), is used as a reinforcing member. Thus, the thread-like member 56, extending spirally from the center of the contact portion 42 of the elastic membrane 4c, is embedded in substantially the entire area of the contact portion 42 to reinforce substantially the entire area of the contact portion 42 with the thread-like member (reinforcing member) 56.

In the thread-like member (reinforcing member) 56 of this embodiment, embedded in a spiral pattern in substantially the entire area of the contact portion 42, the spacing $L_2$ between adjacent turns of the thread-like member 56 in the radial direction is preferably not more than 20 mm.

Figure 9:
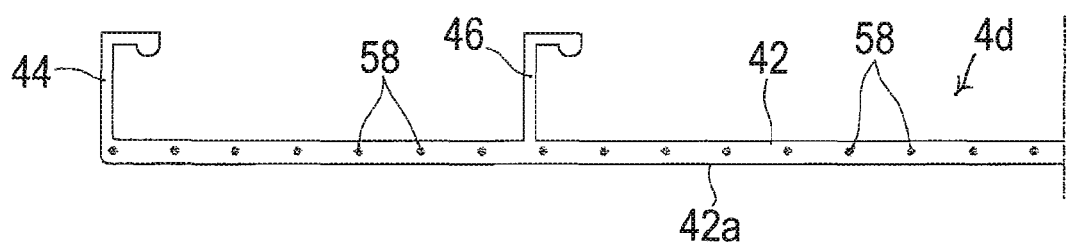
FIG. 9 is a cross-sectional view of a portion of an elastic membrane according to yet another embodiment of the present invention.
Figure 10:
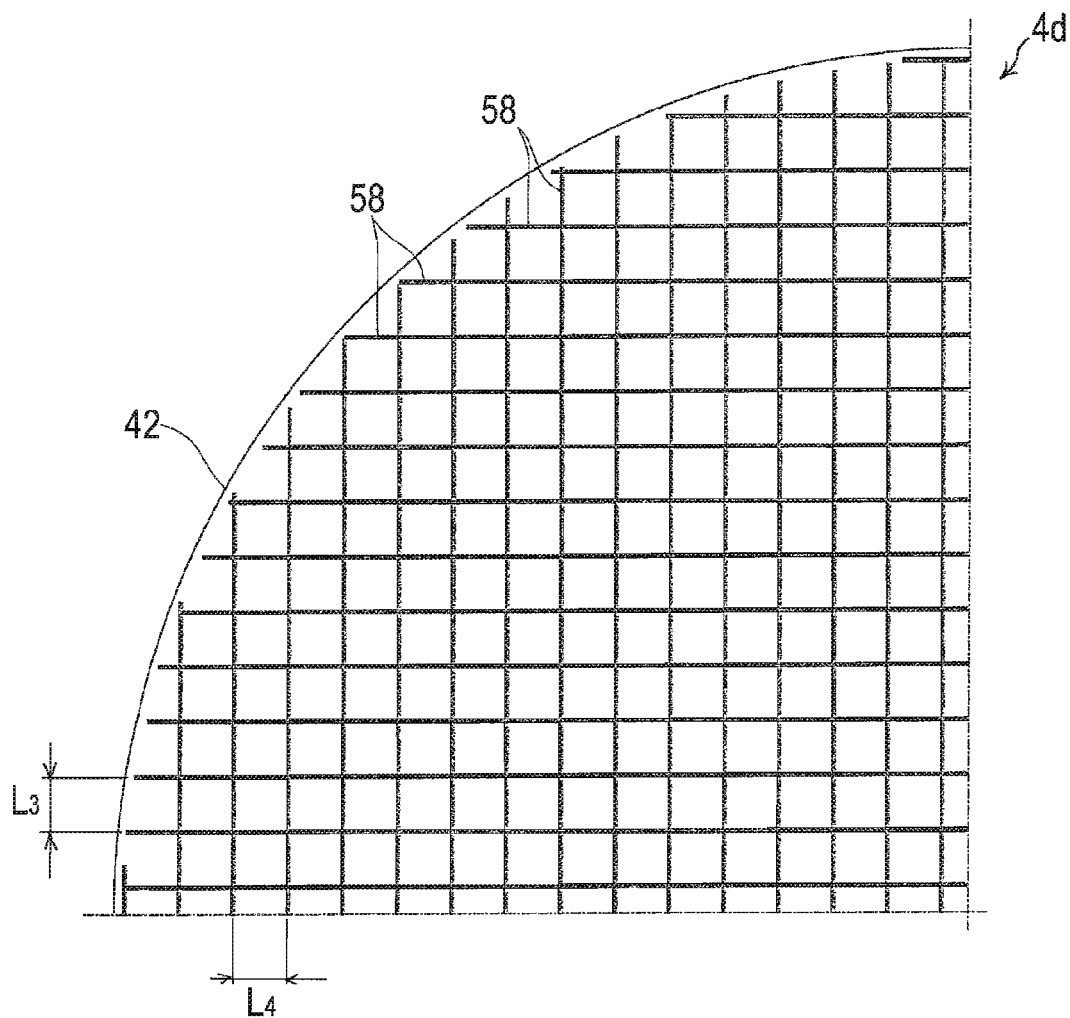
FIG. 10 is a diagram illustrating the reinforcing member embedded in a grid-like pattern in the contact portion of the elastic membrane shown in FIG. 9.

FIGS. 9 and 10 show an elastic membrane 4d according to yet another embodiment of the present invention. The elastic membrane 4d of this embodiment differs from the elastic membrane 4a shown in FIGS. 5 and 6 in that thread-like members 58, having a higher rigidity (longitudinal elastic modulus) than the elastic membrane 4d and arranged in a grid-like pattern, are used as a reinforcing member. Thus, the thread-like members 58, extending linearly in orthogonal directions in a grid-like pattern, are embedded in substantially the entire area of the contact portion 42 of the elastic membrane 4d to reinforce substantially the entire area of the contact portion 42 with the thread-like members (reinforcing member) 58.

In the thread-like members (reinforcing member) 58 of this embodiment, embedded in a grid-like pattern in substantially the entire area of the contact portion 42, the pitches $L_3$ and $L_4$ of the thread-like members 58 in the orthogonal directions are both preferably not more than 20 mm.

Isotropy is required for the effect of reducing stretch (elongation) of the contact portion of an elastic membrane in a direction parallel to the contact surface. Therefore, when a circular substrate W, such as a semiconductor wafer, and a circular contact portion 42, conforming to the shape of the substrate W, are used, the contact portion 42 can be reinforced uniformly substantially over the entire area while ensuring the isotropic stretch-reducing effect by reinforcing substantially the entire area of the contact portion 42 with the concentric circular thread-like members 52 shown in FIGS. 5 and 6, the radial thread-like members 54 shown in FIG. 7, or the spiral thread-like member 56 shown in FIG. 8.

When substantially the entire area of the contact portion 42 is reinforced with the thread-like members (reinforcing member) 58 arranged in a grid-like pattern, as shown in FIGS. 9 and 10, it is desirable to use a combination of two or more arrangement manners with different phases in order to ensure the isotropic stretch-reducing effect.

Figure 11:
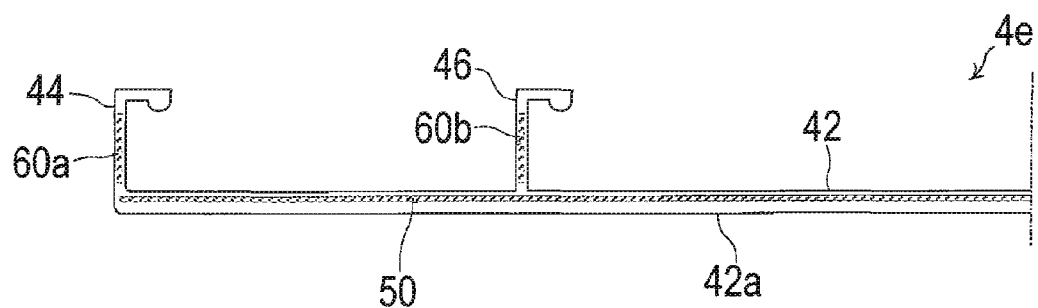
FIG. 11 is a cross-sectional view of a portion of an elastic membrane according to yet another embodiment of the present invention.

FIG. 11 shows an elastic membrane 4e according to yet another embodiment of the present invention. The elastic membrane 4e of this embodiment differs from the elastic membrane 4 shown in FIGS. 2 through 4 in that substantially the entire area of the vertical portions of the first peripheral wall portion 44 and the second peripheral wall portion 46, excepting the junctions of the vertical portions with the contact portion 42, is reinforced with a second reinforcing member so as to reduce outward deformation of the first peripheral wall portion 44 and the second peripheral wall portion 46 when the first pressure chamber 5 and the second pressure chamber 7 are pressurized by a pressurized fluid, as described above. In particular, in this embodiment, a second reinforcing member, which is a sheet-like resin plate 60a having a thickness of, e.g., not more than 1 mm and having a higher rigidity (longitudinal elastic modulus) than the elastic membrane 4e, is embedded in substantially the entire area of the vertical portion of the first peripheral wall portion 44 to reinforce substantially the entire area of the vertical portion of the first peripheral wall portion 44 with the resin plate (second reinforcing member) 60a. Similarly, a second reinforcing member, which is a sheet-like resin plate 60b having a thickness of, e.g., not more than 1 mm and having a higher rigidity (longitudinal elastic modulus) than the elastic membrane 4e, is embedded in substantially the entire area of the vertical portion of the second peripheral wall portion 46 to reinforce substantially the entire area of the vertical portion of the second peripheral wall portion 46 with the resin plate (second reinforcing member) 60b.

As described above, the first peripheral wall portion 44 and the second peripheral wall portion 46, which are coupled to the contact portion 42 and extend upwardly, are required to have sufficient stretchability in a direction perpendicular to the contact surface 42a of the contact portion 42. According to this embodiment, the requirement can be met by reinforcing substantially the entire area of the vertical portions of the first peripheral wall portion 44 and the second peripheral wall portion 46, excepting the junctions of the vertical portions with the contact portion 42, with the second reinforcing member while ensuring sufficient stretchability at the junctions.

It is possible to use a woven fabric of a non-woven fabric instead of the resin plates 60a, 60b, as described above. Thus, substantially the entire area of the vertical portions of the first peripheral wall portion 44 and the second peripheral wall portion 46 may be reinforced with a woven or non-woven fabric embedded in the first peripheral wall portion 44 and the second peripheral wall portion 46.

Figure 12:
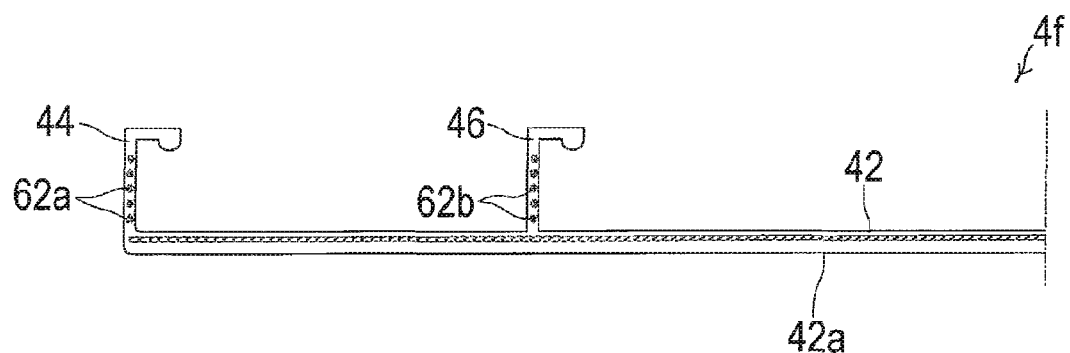
FIG. 12 is a cross-sectional view of a portion of an elastic membrane according to yet another embodiment of the present invention.

FIG. 12 shows an elastic membrane 4f according to yet another embodiment of the present invention. The elastic membrane 4f of this embodiment differs from the elastic membrane 4e shown in FIG. 11 in the following respects: Annular thread-like members 62a, having a higher rigidity (longitudinal elastic modulus) than the elastic membrane 4f and arranged at predetermined intervals in the height direction, are embedded as a second reinforcing member in substantially the entire area of the vertical portion of the first peripheral wall portion 44 to reinforce substantially the entire area of the vertical portion of the first peripheral wall portion 44 with the thread-like members (second reinforcing member) 62a. Similarly, annular thread-like members 62b, having a higher rigidity (longitudinal elastic modulus) than the elastic membrane 4f and arranged at predetermined intervals in the height direction, are embedded as a second reinforcing member in substantially the entire area of the vertical portion of the second peripheral wall portion 46 to reinforce substantially the entire area of the vertical portion of the second peripheral wall portion 46 with the thread-like members (second reinforcing member) 62b.

Decrease in the stretchability of the first peripheral wall portion 44 and the second peripheral wall portion 46 in the height direction can be minimized by reinforcing the first peripheral wall portion 44 and the second peripheral wall portion 46 with the annular thread-like members 62a and 62b, respectively, arranged at predetermined intervals in the height direction.

It is possible to use a continuous coiled thread-like member as a second reinforcing member instead of the annular thread-like members 62a, 62b. Thus, substantially the entire area of the vertical portions of the first peripheral wall portion 44 and the second peripheral wall portion 46 may be reinforced with the coiled thread-like member embedded in the first peripheral wall portion 44 and the second peripheral wall portion 46. This also can minimize decrease in the stretchability of the first peripheral wall portion 44 and the second peripheral wall portion 46 in the height direction.

Though both of the first peripheral wall portion 44 and the second peripheral wall portion 46 are reinforced with a second reinforcing member in the above-described embodiments, it is also possible to reinforce only one of the first peripheral wall portion 44 and the second peripheral wall portion 46 with a second reinforcing member.

Figure 13:
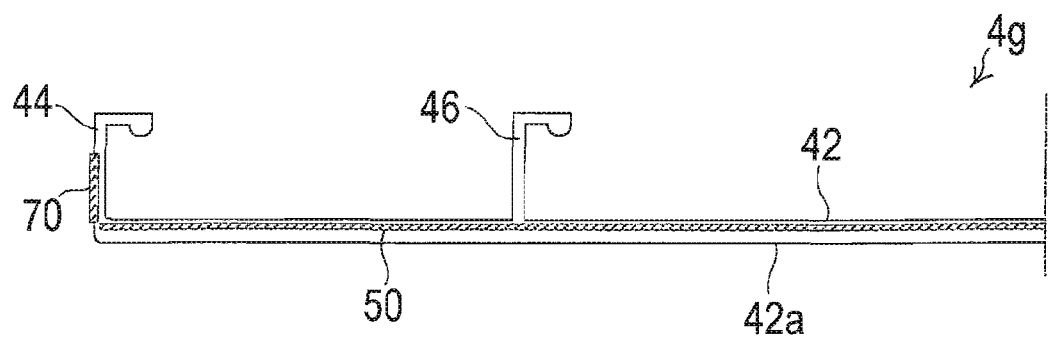
FIG. 13 is a cross-sectional view of a portion of an elastic membrane according to yet another embodiment of the present invention.

FIG. 13 shows an elastic membrane 4g according to yet another embodiment of the present invention. The elastic membrane 4g of this embodiment differs from the elastic membrane 4 shown in FIGS. 2 through 4 in that a plate-like low-friction member 70 is attached to the outer surface of the first peripheral wall portion 44 of the elastic membrane 4g. By thus attaching the low-friction member 70 to the outer surface of the first peripheral wall portion 44 of the elastic membrane 4g, it becomes possible to reduce a loss in the pressure of the retainer ring 3 on the polishing surface 101a of the polishing pad 100 in an area around the periphery of a substrate W if, due to elongation of the contact portion 42 of the elastic membrane 4g, the first peripheral wall portion 44 comes into contact with the retainer ring 3 (see FIG. 2).

Figure 14:
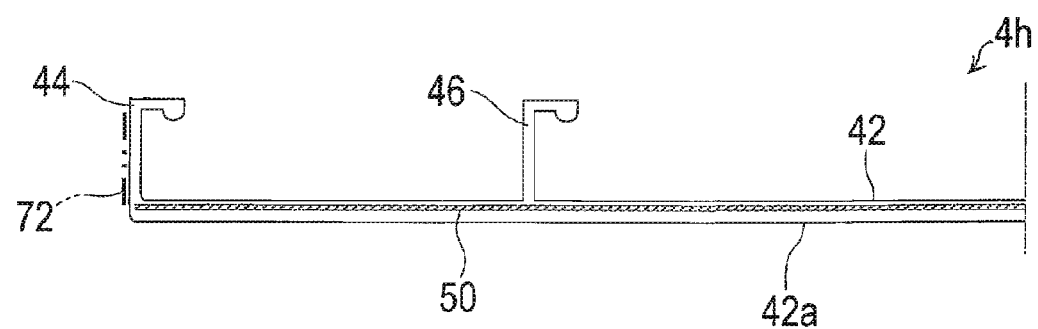
FIG. 14 is a cross-sectional view of a portion of an elastic membrane according to yet another embodiment of the present invention.

FIG. 14 shows an elastic membrane 4h according to yet another embodiment of the present invention. The elastic membrane 4h of this embodiment differs from the elastic membrane 4g shown in FIG. 13 in that instead of the plate-like low-friction member 70, a coating film 72 is formed on the outer surface of the first peripheral wall portion 44 of the elastic membrane 4h. The coating film 72 is, for example, an impregnated film or a fluoropolymer film.

The use of the coating film 72, formed on the outer surface of the first peripheral wall portion 44 of the elastic membrane 4h, as a low-friction member can prevent a significant increase in the thickness of the first peripheral wall portion 44.

While the present invention has been described with reference to preferred embodiments, it is understood that the present invention is not limited to the embodiments described above, but is capable of various changes and modifications within the scope of the inventive concept as expressed herein.

What is claimed is:

1. An elastic member for use in a substrate holding apparatus for holding a substrate with a retainer ring located around a periphery of the substrate, said elastic member comprising:
    an elastic membrane having a contact portion, a first peripheral wall portion, and a second peripheral wall portion; and
    a first reinforcing member having a higher rigidity than the elastic membrane and reinforcing substantially an entire area of the contact portion of the elastic membrane,
    wherein the contact portion of the elastic member has a contact portion for contact with the substrate,
    wherein the first peripheral wall portion of the elastic membrane is coupled to a peripheral end of the contact portion and extends upwardly,
    wherein the second peripheral wall portion of the elastic member is located on an inside of the first peripheral wall portion, is coupled to the contact portion and extends upwardly,
    wherein the second peripheral wall portion of the elastic member defines a first chamber on an outer side thereof and a second chamber on an inner side thereof, and
    wherein the first reinforcing member is embedded in substantially the entire area of the contact portion of the elastic membrane.

2. The elastic member of claim 1, wherein the contact portion has a circular shape, and the first reinforcing member is comprised of thread-like members arranged in a radial pattern in substantially the entire area of the contact portion.

3. The elastic member of claim 1, wherein the contact portion has a circular shape, and the first reinforcing member is comprised of annular thread-like members arranged in a concentric pattern in substantially the entire area of the contact portion.

4. The elastic member of claim 1, wherein the contact portion has a circular shape, and the first reinforcing member is comprised of a thread-like member arranged in a spiral pattern in substantially the entire area of the contact portion.

5. The elastic member of claim 1, wherein the first reinforcing member is comprised of thread-like members arranged in a grid-like pattern in substantially the entire area of the contact portion.

6. The elastic member of claim 1, wherein the first reinforcing member is comprised of a non-woven fabric or a woven fabric disposed in substantially the entire area of the contact portion.

7. The elastic member of claim 1, wherein the first reinforcing member is comprised of a resin plate disposed in substantially the entire area of the contact portion.

8. The elastic member of claim 1, wherein the contact portion has suction holes, and the first reinforcing member is disposed in a region other than the suction holes and their vicinities.

9. The elastic member of claim 1, wherein at least one of the first peripheral wall portion and the second peripheral wall portion is reinforced with a second reinforcing member having a higher rigidity than the elastic membrane.

10. The elastic member of claim 9, wherein the second reinforcing member is comprised of annular thread-like members arranged at predetermined intervals in the height direction.

11. The elastic member of claim 9, wherein the second reinforcing member is comprised of a coiled thread-like member.

12. The elastic member of claim 9, wherein the second reinforcing member is comprised of a resin plate, a non-woven fabric or a woven fabric.

13. The elastic member of claim 1, wherein a low-friction member is attached to an outer surface of the first peripheral wall portion.

14. The elastic member of claim 13, wherein the low-friction member is a coating film.

15. The elastic member of claim 14, wherein the coating film is an impregnated film.

16. The elastic member of claim 14, wherein the coating film is a fluoropolymer film.

17. An elastic member for use in a substrate holding apparatus for holding a substrate with a retainer ring located around a periphery of the substrate, said elastic member comprising:
  an elastic membrane having a contact portion, a first peripheral wall portion, and a second peripheral wall portion; and
  a first reinforcing member having a higher rigidity than the elastic membrane and reinforcing substantially an entire area of the contact portion of the elastic membrane,
  a second reinforcing member having a higher rigidity than the elastic membrane,
  wherein the contact portion of the elastic member has a contact portion for contact with the substrate,
  wherein the first peripheral wall portion of the elastic membrane is coupled to a peripheral end of the contact portion and extends upwardly,
  wherein the second peripheral wall portion of the elastic member is located on an inside of the first peripheral wall portion, is coupled to the contact portion and extends upwardly,
  wherein the second peripheral wall portion of the elastic member defines a first chamber on an outer side thereof and a second chamber on an inner side thereof, and
  wherein the second reinforcing member reinforces at least one of the first peripheral wall portion and the second peripheral wall portion, excepting a junction of a vertical portion with the contact portion.

18. The elastic member of claim 17, wherein the second reinforcing member is comprised of annular thread-like members arranged at predetermined intervals in the height direction.

19. The elastic member of claim 17, wherein the second reinforcing member is comprised of a coiled thread-like member.

20. The elastic member of claim 17, wherein the second reinforcing member is comprised of a resin plate, a non-woven fabric or a woven fabric.

21. The elastic member of claim 17, wherein a low-friction member is attached to an outer surface of the first peripheral wall portion.

22. An elastic member for use in a substrate holding apparatus for holding a substrate with a retainer ring located around a periphery of the substrate, said elastic member comprising:
  an elastic membrane having a contact portion, a first peripheral wall portion, and a second peripheral wall portion; and
  a first reinforcing member having a higher rigidity than the elastic membrane and reinforcing substantially an entire area of the contact portion of the elastic membrane,
  wherein the contact portion of the elastic member has a contact portion for contact with the substrate,
  wherein the first peripheral wall portion of the elastic membrane is coupled to a peripheral end of the contact portion and extends upwardly,
  wherein the second peripheral wall portion of the elastic member is located on an inside of the first peripheral wall portion, is coupled to the contact portion and extends upwardly,
  wherein the second peripheral wall portion of the elastic member defines a first chamber on an outer side thereof and a second chamber on an inner side thereof, and
  wherein a low-friction member is attached to an outer surface of the first peripheral wall portion.

23. The elastic member of claim 22, wherein the low-friction member is a coating film.

24. The elastic member of claim 23, wherein the coating film is an impregnated film.

25. The elastic member of claim 23, wherein the coating film is a fluoropolymer film.

* * * * *